July 31, 1923.
H. LUTZ
SHOCK ABSORBER
Original Filed May 17, 1921
1,463,219
2 Sheets-Sheet 1
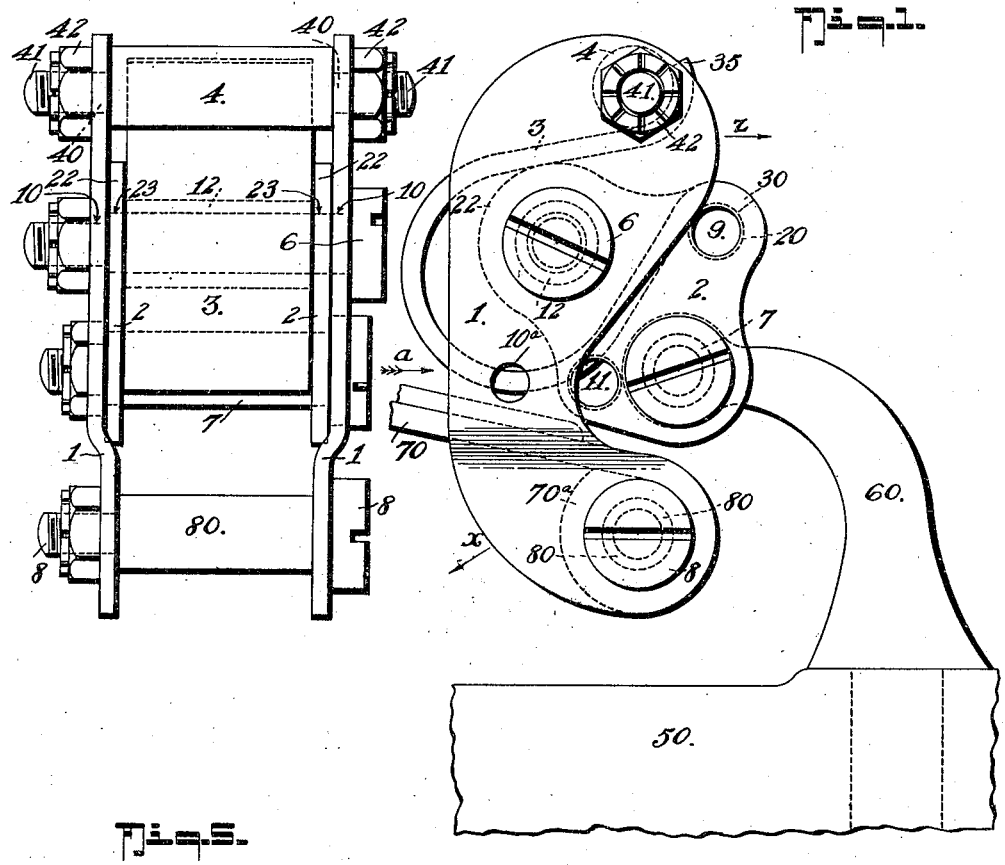
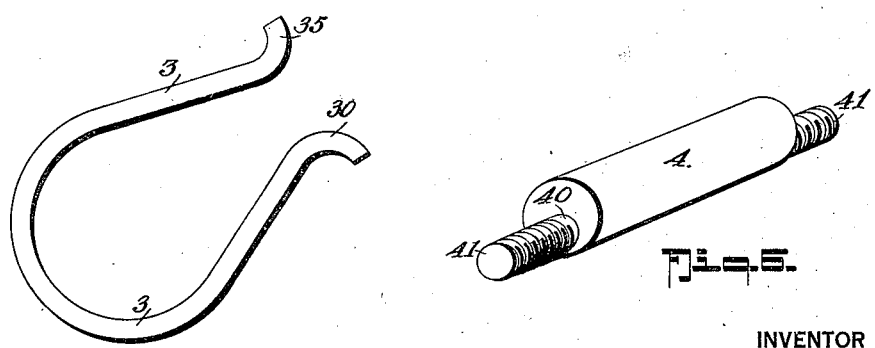
INVENTOR
Herbert Lutz.
BY
Fred G. Dieterich
ATTORNEYS

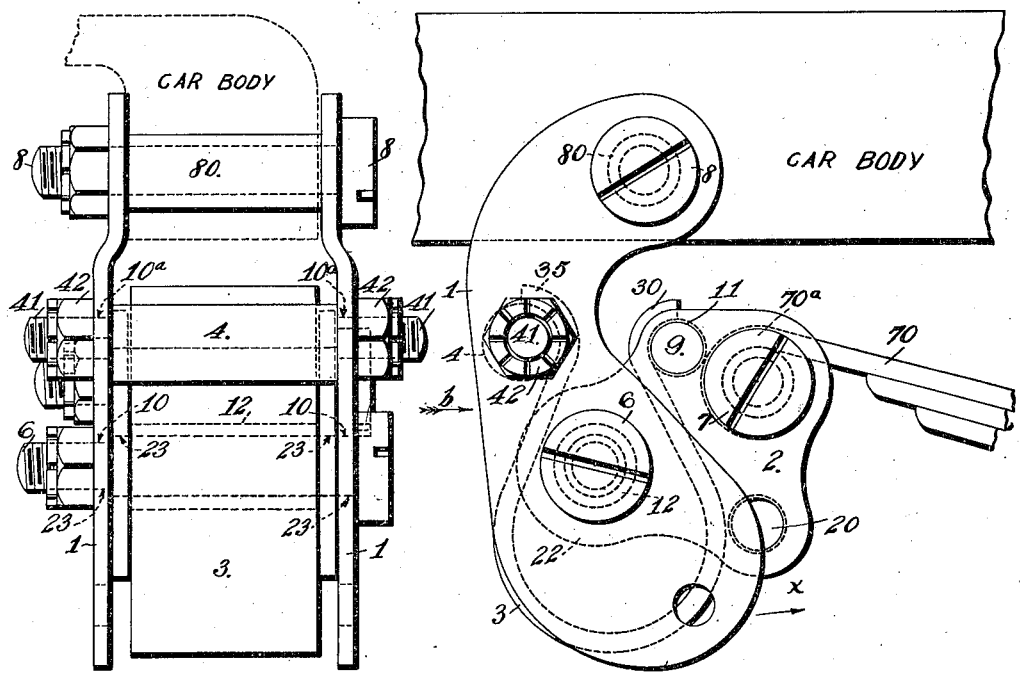

Patented July 31, 1923.

1,463,219

UNITED STATES PATENT OFFICE.

HERBERT LUTZ, OF HAMILTON, ONTARIO, CANADA, ASSIGNOR TO GEORGE MORRIS, OF HAMILTON, ONTARIO, CANADA.

SHOCK ABSORBER.

Application filed May 17, 1921, Serial No. 470,293. Renewed December 26, 1922.

*To all whom it may concern:*

Be it known that I, HERBERT LUTZ, a citizen of the Dominion of Canada, residing at Hamilton, in the Province of Ontario, Canada, have invented a new and Improved Shock Absorber, of which the following is a specification.

This invention has reference to certain improvements in or relating to spring suspension mechanism for motor or other vehicles and while more especially adapted for use in connection with Ford and Dodge types of motor cars it may be readily designed for use on larger cars equipped with side springs, and primarily my said invention has for its purpose to provide an improved spring suspension that will satisfactorily absorb the vibrations and shocks and make the vehicle, to which such suspension may be applied, run as easily under a minimum or maximum heavy load when the shocks or vibrations are either in the horizontal or inclined directions.

Another object of my invention is to provide a spring suspension which, while more especially designed for being applied to the Ford shackle type of cars may, by a simple reversal of the parts, be applied to other shackle types of cars; in which the several parts that constitute my improved shock absorber are of a simple construction and capable of being easily assembled and applied to a motor vehicle in such manner that the same will not easily become disarranged under ordinary usage.

With other objects in view, that will hereinafter appear, my invention embodies the peculiar features and novel combination of parts all of which will be fully outlined in the following detailed description thereof, specifically stated in the appended claims and illustrated in the accompanying drawing, in which:

Figure 1 is a front elevation of my shock absorber, the parts being particularly designed for connection with the axle and the body spring of a Ford car.

Figure 2 is an end view thereof looking in the direction of the arrow *a* on Figure 1.

Figure 3 is a front elevation of my invention, the same being in the reversed or upside down position, to that shown in Figures 1 and 2, for connection with the Dodge and other like cars.

Figure 4 is an end elevation thereof looking in the direction of the arrow *b* in Figure 3.

Figure 5 is a perspective view of the anti-shock spring device.

Figure 6 is a perspective view of the shiftable eccentric stud bolt or spring tightener, hereinafter mentioned.

Referring now more particularly to Figures 1 and 2 of the drawing, which show my improved shock absorber or spring suspension as applied to a Ford car, 50 designates an axle portion, 60 one of the conventional forms of spring hanger brackets and 70 an adjacent end of a portion of the main or car spring.

My construction of shock absorber consists essentially of a hanger frame, that acts as a main shackle portion and a rocker frame which cooperates with the main hanger frame and constitutes the other principle element of the shackle connection.

In Figures 1 and 2, 1—1 designate opposite side members of a main hanger frame, and these are held spaced apart, but in a relatively fixed relation, by a bottom spacer sleeve 80 and a screw bolt 8 that passes through apertures in the lower end of the hanger members and through the sleeve 80, and by an eccentric stud 4 located at the upper ends of the hanger members 1 and which constitute a rest or holder for the free end of the shock or rebound spring, presently again referred to.

The upper spacer or stud 4 has opposite pintles 40—40 of reduced diameter to pass through the apertures in the adjacent hangers 1, and the said pintles have threaded extensions 41—41 for receiving the clamp nuts 42—42, each of which has notched portions for receiving a spanner or like implement for tightening up the nuts 42—42 to hold the eccentric stud 4 to any of its positions when adjusted for tightening the rebound or shock spring.

The shock spring 3, which is of substantially the shape shown in Figure 3, terminates at one end in a half loop 30 for engaging a cross pin 9 which extends through the apertures 20 in the upper free end of the opposite side members 2—2 that constitute a rocker frame and which connect with the hanger frame through the bolt 6, as is shown in Figure 1 and presently again mentioned.

It will be noticed, by reference to Figure 1, the opposite side members 2—2 of the rocker frame are fulcrumed on a cross bolt 7 that connects the lower ends of the said rocker frame with the axle bracket or post 60 and each of the side members 2—2 of the said rocker frame includes an outwardly extended ear-like portion 22, each of which is provided with an aperture 23.

The ear portions 22 of the rocker frame, when the parts are operatively assembled, as in Figures 1 and 2, extend inside of their adjacent hanger frame side members 1, the latter being fulcrumed. When the absorber is used, as in Figures 1 and 2, on a central bolt 6 that passes through apertures 10—10 in the side 1 through the apertures 23 in the side 2 and through a spacer sleeve 12, the threaded end of the bolt having a tightener nut applied thereon, as is clearly shown in Figure 2.

At the downward outer edge, each side member of the rocker frame has a supplemental aperture 11, the purpose of which will hereinafter appear.

The end portion of the main or car spring 70 has a loop $70^a$ which surrounds the lower spacer sleeve 80 and constitutes the lower hanger connection for the main or hanger frame.

Each of the opposite side members 1 of the main hanger frame has a supplemental aperture $10^a$, the reason for which will appear when describing the adjustment of my shock absorber, arranged as in Figures 3 and 4.

So far as described, it will be readily apparent, that when the parts that constitute my shock absorber are applied, as in Figures 1 and 2, the main hanger frame has a rocking motion, with respect to the rocker frame, in the direction of the arrow $x$ on Figure 1, when the main spring is on the rebound, and the shock incident to such rebound is taken up by the shock spring, by reason of the eccentric spacer stud 4 constituting a stop against which the turned up end 35 of the spring presses, and thereby practically all of the jolt, incident in the rebound, is taken up between the flexibly connected frames or shackle connections 1 and 2, owing to the peculiar mounting of the rocker frame member 2 upon the axle bracket 60.

It will be understood that when excessive pressure is exerted on the main spring the shock spring yields as the hanger frame rocks inwardly on its fulcrum sleeve 6 and thereby helps to yieldably support the end of the main spring coupled therewith.

When traveling over rough places and the main spring rebounds, the hanger frame is permitted to rock inwardly (see arrow $z$) aided by expansion of the shock spring 3, the rebound of the main spring and concentric retraction of the end of spring 70 to which the lower end of the hanger frame is coupled, tending to swing the said hanger frame back against the tension of the shock or take-up spring 3.

When my improved shock absorber devices are to be applied to a Dodge type of car, the shackle frame members are positioned reversely to that shown in Figures 1 and 2, the lower end of the hanger frame being uppermost and pivotally hung from the car body by the bolt and sleeve connections 8—80 and the rocker frame 2, instead of being fulcrumed on the bracket post 60, is fulcrumed on the loop end of the main car spring by the bolt and sleeve connection 7, as shown.

In this latter adjustment of the parts, the bolt 6 constitutes the fulcrum connection of the main or hanger frame and the rocker frame, as is the case in Figures 1 and 2.

In the arrangement of my absorber, as in Figures 3 and 4, the same type of spring 3 is employed, the same being shaped as shown in Figure 5, and in this arrangement the outer end 30 of one portion of the spring engages a bolt 9 that passes through the supplemental apertures 11 in the side members 2—2, before referred to, and the cam stud and spacer 4 is fitted, with its pintles 40, to turn in the supplemental apertures $10^a$—$10^a$ in the hanger sides 1—1, as shown.

In this latter adjustment, the several parts operate to take up the shocks in the same manner as is incident in the application to such parts to the Ford car spring and axle members, as shown in Figures 1 and 2.

From the foregoing description taken in connection with the accompanying drawing, the complete construction and manner of its application and operation, with the advantages thereof, will be readily understood to those familiar with the manufacture and use of suspension spring connections of the kind to which my invention relates.

What I claim is:

1. In a spring suspension for road vehicles wherein is provided a main spring, one end of which is adapted to be connected with a fixed part of the vehicle, said main spring and said fixed part of the vehicle constituting two elements; a rocker frame, means for pivotally sustaining said frame on one of said elements, a hanger frame, means for pivotally sustaining said hanger frame to oscillate in the direction of the length of the main spring, means for coupling said hanger to the other of said elements, and an auxiliary spring that engages stop portions on the rocker and hanger frames and tends to normally oppose the rebound tension of the main spring.

2. In a spring suspension for road vehicles wherein is provided a main spring and a fixed part of the vehicle with which the main spring is adapted to be connected, said main spring and said fixed part of the vehicle constituting two elements; a rocker frame, means for fulcruming said rocker frame on one of said elements, a hanger frame pivotally mounted between its ends on the rocker frame to oscillate in the longitudinal direction of the main spring, means for pivotally connecting one end of the hanger frame to the other of said two elements, the adjacent upper ends of the two frames each having removable cross bolts, and a loop-shaped shock absorber spring whose ends engage the cross bolts of the adjacent upper ends of the rocker and hanger frames whereby to take up the rebound tension of the main spring imparted to said frames.

3. In a spring suspension for road vehicles wherein is provided a main spring and a fixed part of the vehicle, said main spring and fixed part of the vehicle constituting two elements; a rocker frame, means for fulcruming said rocker frame on one of said elements, a hanger frame pivotally mounted between its ends on the rocker frame to oscillate in the longitudinal direction of the main spring, means for pivotally connecting one end of the said hanger frame to the other of said two elements, the adjacent upper ends of said hanger frame and said rocker frame each having a removable cross bolt and a loop shaped shock absorber spring whose ends engage the cross bolts of the adjacent upper ends of the rocker and hanger frames whereby to take up the rebound tension of the main spring imparted to said frames, said hanger and rocker frames having supplemental apertures for interchangeably receiving the adjacent removable cross bolts therein.

4. In a spring suspension for road vehicles wherein is provided a main spring and a fixed part of the vehicle with which the main spring is adapted to be connected, said main spring and said fixed part of the vehicle constituting two elements; a rocker frame, means for fulcruming said rocker frame on one of said elements, a hanger frame pivotally mounted between its ends on the rocker frame to oscillate in the longitudinal direction of the main spring, means for pivotally connecting one end of the hanger frame to the other of said two elements, the adjacent upper ends of the two frames each having removable cross bolts, and a loop-shaped shock absorber spring whose ends engage the cross bolts of the adjacent upper ends of the rocker and hanger frames whereby to take up the rebound tension of the main spring imparted to said frames, one of said cross bolts being of eccentric shape in cross section, and means engaging said eccentric bolts and the frame portion between which it is held for locking said bolt to its adjustments for pressing against the co-engaging end of the shock absorber spring.

5. A shock absorber for road vehicles comprising in combination with an axle bracket post and the adjacent end of the main vehicle spring; a rocker frame mounted on the bracket post to oscillate in the direction of the length of the axle, a lever frame that is pivotally hung midway its ends on the rocker frame, means for pivotally joining the lower end of the lever frame to the end of the main spring, the upper end of the lever and the rocker frames each having a transverse bolt, and a loop shaped auxiliary shock absorbing spring interposed between the hanger and the rocker frames and having its opposite ends shaped to seat against the opposing cross bolts in the lever and rocker frames, the lever frame and the rocker frame each having supplemental apertures for interchangeably receiving the cross bolts against which the ends of the auxiliary springs seat.

6. A spring suspension for road vehicles comprising a rocker frame adapted for being hung on a bracket post of the vehicle axle and having a pair of oppositely disposed sets of apertures located at opposite sides of its pivotal connection, a cross bolt adapted for being interchangeably mounted in either of the said sets of apertures, a hanger frame composed of opposite members that straddle the forward edge of the rocker frame, means for pivotally connecting the said opposite members of the hanger frame midway their ends to the forward edge of the said rocker frame, the said hanger frame having a set of transversely aligned apertures at each of its ends opposite its pivotal connection, an eccentric bolt interchangeably mounted in either the upper or lower set of apertures, means for pivotally connecting the lower end of the hanger frame with the upper end of the main spring and a loop shaped auxiliary spring held between the opposite sides of the rocker and hanger frames and having its free ends shaped to seat against the oppositely disposed cross bolts in the rocker and hanger frame, and means for adjusting the position of the eccentrically shaped cross bolt for regulating the tension of the auxiliary spring.

7. A shock absorber comprising a rocker frame and a hanger frame, means pivotally connecting said rocker frame in said hanger frame intermediate the ends thereof, said hanger frame and said rocker frame having pivotal portions adapted to be connected to the respective parts of the vehicle for which they are designed, and a loop-shaped spring passing around the pivotal connection of the hanger and rocker frames, and fixed abutments on the hanger and rocker frames against which the end of said loop-shaped spring engage.

8. A shock absorber comprising a rocker frame and a hanger frame, means pivotally connecting said rocker frame in said hanger frame intermediate the ends thereof, said hanger frame and said rocker frame having pivotal portions adapted to be connected to the respective parts of the vehicle for which they are designed, and a loop-shaped spring passing around the pivotal connection of the hanger and rocker frames, and fixed abutments on the hanger and rocker frames against which the end of said loop-shaped spring engage, one of said fixed abutments embodying a cam member and means for securing it rigidly to the part on which it is mounted.

HERBERT LUTZ.

Witnesses:
ERNEST LOVELL,
GEORGE MORRIS.